March 8, 1949.  S. RUBEN  2,463,565
DRY PRIMARY CELL
Filed Dec. 9, 1942  2 Sheets-Sheet 1
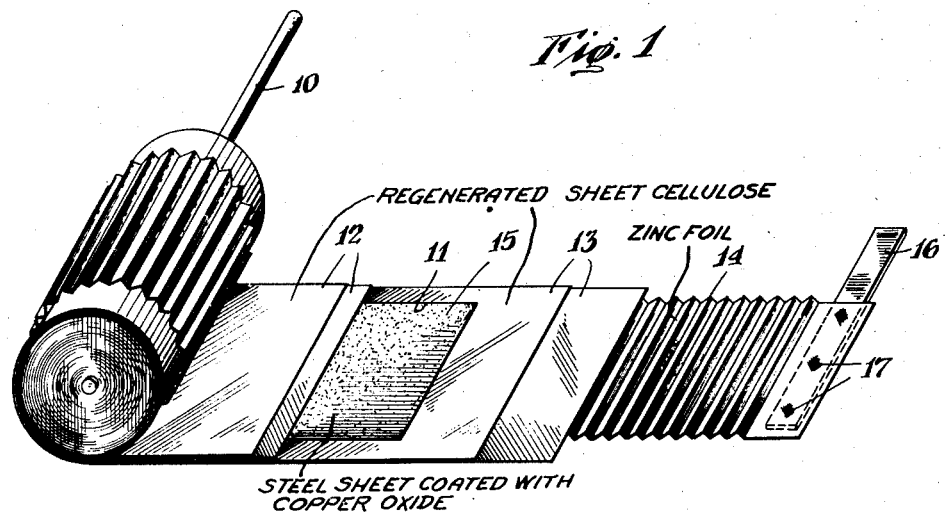
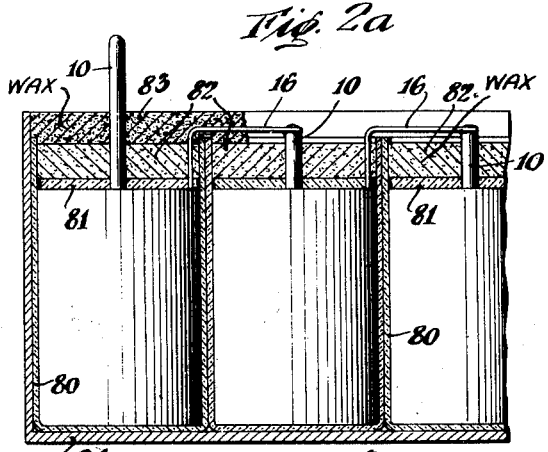
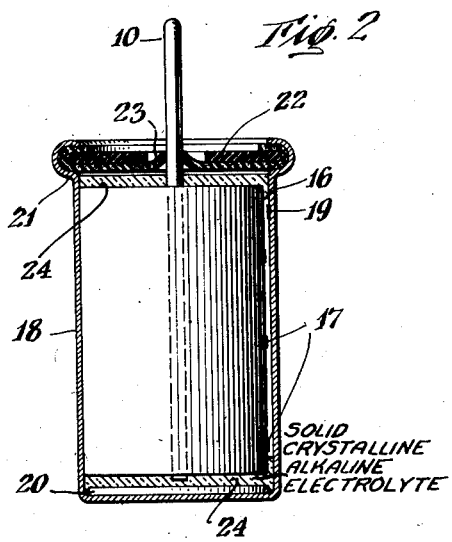
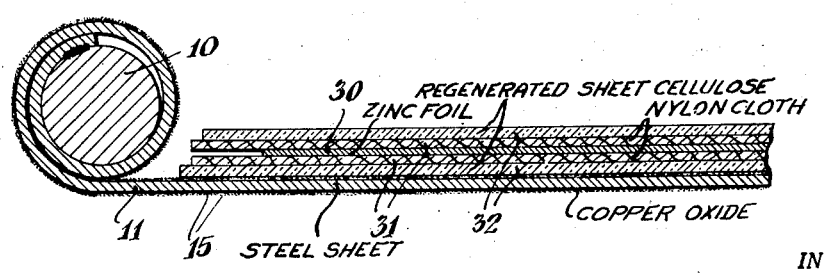
INVENTOR.
Samuel Ruben
BY Robbin + Carlson
ATTORNEYS March 8, 1949.   S. RUBEN   2,463,565
DRY PRIMARY CELL
Filed Dec. 9, 1942   2 Sheets-Sheet 2
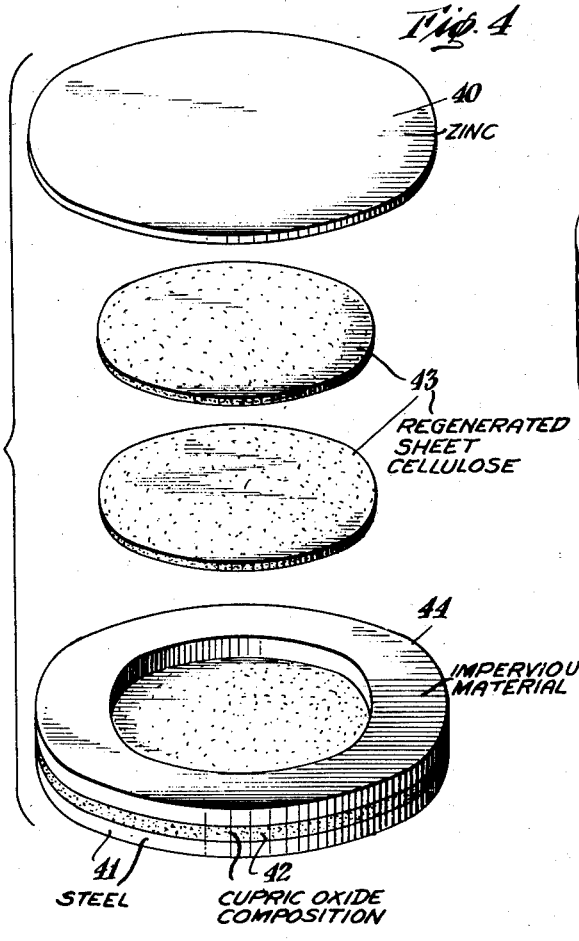
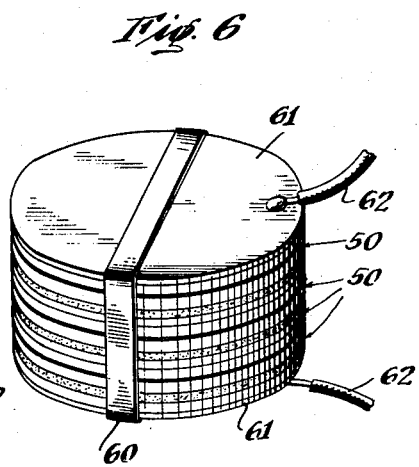
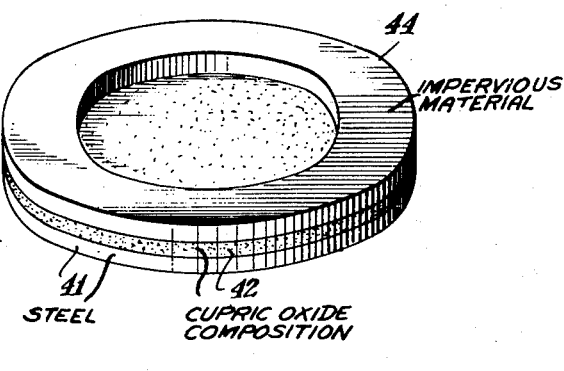
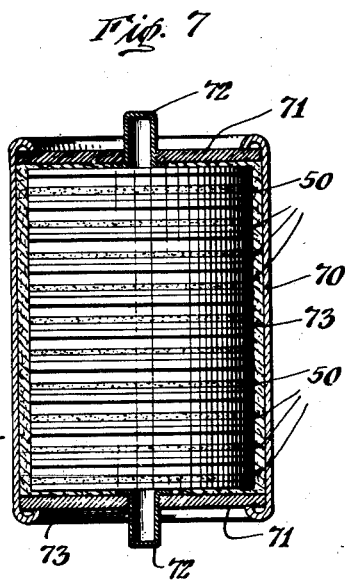
INVENTOR.
Samuel Ruben
BY Robbin + Carlson
ATTORNEYS Patented Mar. 8, 1949

2,463,565

UNITED STATES PATENT OFFICE 2,463,565

DRY PRIMARY CELL

Samuel Ruben, New Rochelle, N. Y.

Application December 9, 1942, Serial No. 468,386

6 Claims. (Cl. 136—116)

This invention relates to methods of making dry primary cells.

An object of the invention is to improve dry cells.

Another object is to improve the life of a primary cell under adverse conditions.

Other objects of the invention will be apparent from the description and claims.

The present application is a continuation in part of my prior filed co-pending application, Serial Number 456,160, filed August 26, 1942, now abandoned.

In the drawings:

Figure 1 is a perspective view of a portion of a primary cell during assembly, portions of one electrode and of the spacers being cut away to better illustrate the order of the layers;

Figure 2 is a section through the completed primay cell;

Figure 2a is a section partly broken away through primary cells of modified construction, arranged in a battery;

Figure 3 illustrates an electrode assembly of a modified construction.

Figure 4 shows the parts for a disc type cell arranged in the order of assembly;

Figure 5 is a cross section through a completed disc cell;

Figure 6 illustrates a battery formed of securing together several cells in face-to-face contact; and Figure 7 shows, in section, a battery made of several cells enclosed in a cardboard tube.

The present invention contemplates a primary cell for supplying current as a result of electrochemical action wherein the electrolyte is a solid crystalline material containing water of hydration. The invention is applicable to primary cells of various types using a variety of electrodes and acid, alkaline or salt electrolytes having included water of hydration. The invention, in its preferred form, uses alkaline electrolytes, such as the alkali metal hydroxides containing water of hydration.

Heretofore primary cells have been produced using alkaline electrolytes such as potassium and sodium hydroxide as liquid solutions. These have always required careful handling in order to prevent loss of the electrolyte. Moreover, such primary cells were subject to rapid deterioration at elevated temperatures due to accelerated attack on the electrodes by the electrolyte. Zinc is commonly used as one electrode in such cells and it is quite susceptible to attack by liquid alkaline solutions.

Depolarizing electrodes for such cells have been formed either of porous carbon or of cupric oxide. The porous carbon type depends upon air for depolarizing effect. The cupric oxide type is not dependent upon air and permits a relatively high current capacity for a given volume of cell. However, when the cell is left on open circuit, trouble results due to some of the copper compound dissolving in the electrolyte and migrating to the zinc electrode where copper is deposited, setting up local electrochemical action and causing rapid dissolution of the zinc electrode. This action is much accelerated when the temperature of the cell is increased. For this reason such cells have heretofore not been found satisfactory where they were required to be stored or left on open circuit for any extended period of time and it has been also necessary to space the zinc and copper compound electrodes rather far apart.

In the prior art in the so-called dry cells the electrolyte is a liquid but is prevented from running out of the cell by being absorbed in a porous solid such as paper, carbon, manganese dioxide or finely divided inert porous materials. However, the electrolyte remains as liquid when absorbed in these media. Its chemical and corrosive action at high temperatures, resulting in a deterioration of the cells, is not reduced. Electrolytes have also been immobilized by the addition of a gelatinizing agent such as starch but generally this has not reduced the chemical shelf action or deterioration at elevated temperatures.

I have found that alkaline dry cells can be produced which have a good open circuit life, even at elevated temperatures such as are encountered in the tropics, by using solid crystalline alkaline electrolytes and by closely spacing the cooperating electrodes so as to keep the resistance of the cells at a low value. The solid electrolyte helps to prevent migration of copper compounds which would otherwise attack the zinc electrode and also, because of its solid nature, does not itself readily attack either the zinc or copper oxide electrodes when the cell is on open circuit.

In order for the cells to be of general utility both at temperatures normally encountered in this country and also at elevated temperatures such as are encountered in the tropics or in equipment where considerable heat is generated it is not only necessary that the cells have good shelf life at elevated temperatures, but it is also required that the electrolyte have reasonably good electrical conductivity at the lower temperatures encountered and that the electrolyte remain solid at the higher temperatures.

I have found that solid potassium hydroxide containing water of hydration is an ideal electrolyte for meeting these requirements; that it possesses a much lower specific resistivity in the solid crystalline form than the other solid alkali hydroxides, develops a much higher voltage on load and resists shelf life attack to a higher degree.

Referring to the drawing wherein Figures 1 and 2 illustrate the construction of a dry cell of my invention, the electrode and spacer assembly may be produced in the manner shown in Figure 1. A thin strip of sheet steel 11 coated with a copper compound 15 is welded at one end to a steel rod 10 and then two or three turns of the sheet are wrapped tightly around the rod. Two layers 12 of glycerine-free regenerated sheet cellulose are then laid on one side of the remaining unwound end of the steel strip and two other layers 13 of regenerated sheet cellulose are placed on the opposite side of the steel strip. A strip of corrugated zinc foil 14 is then placed against the outside of one of the cellulose sheets and the entire assembly is wound into a roll wherein the coated steel sheet is separated from the corrugated zinc foil by double layers of regenerated sheet cellulose. The regenerated cellulose separators may be sufficiently long to form a final turn on the outside of the roll.

A depolarizing cupric oxide composition 15 is applied as a coating to steel sheet 11 prior to assembly. The composition may be formed by milling together 46 grams of a mixture of finely divided cupric oxide with 8% of graphite of extremely small particle size, such as 5 to 9 microns and 30 grams of a 10% solution of polymerized vinyl chloride in a solvent, such as an ether. The resulting composition is applied (for example, by spraying or painting) to both surfaces of steel sheet 11 after it has first been sand blasted. Sheet 11 may suitably be formed of steel 2 mils thick. Where operation of the cell at low temperatures is not required, the graphite content may be substantially reduced and for some applications the graphite may be omitted. Generally, the percentage of graphite will be from 0.1% to 10% by weight of the cupric oxide.

A preferred thickness for the coat is about 2.75 mils on each side of the steel backing. After drying, the coating is baked at a temperature of 130° C. for several hours. The coated steel strip may then be rolled between steel rollers such as those used for rolling metal stock. This increases the density and conductivity of the coating, giving it a smooth uniform surface. The rolling is done at a relatively high temperature such as around 125° C.

In the prior art where a composite copper oxide carbon electrode has been used, the function of the carbon has been to lower the resistance of the electrode; whereas in the present cell, the micronized graphite serves primarily to prevent the insulating organic binder from insulating the cupric oxide particles from themselves and from the steel base electrode.

Another method of preparing a copper oxide electrode, where cost is not a factor, is to oxidize a copper or copper plated foil, to provide a cupric oxide surface.

The zinc foil strip 14 is preferably corrugated with about 16 corrugations to the inch, the corrugations being about 2 mils deep. A tab 16 formed of a strip of heavier zinc is spot-welded at 17 to the outer end of the zinc electrode 14 to afford a means for securing the electrode to the container. Zinc 14 may suitably be of 2 or 3 mils in thickness. The regenerated cellulose sheets may each be 1 to 1.5 mils thick when dry and should preferably be free of plasticizer such as glycerine. The cellulose sheets are slightly wider than the electrodes to provide overlapping edges and to prevent short circuits at the edges of the roll.

After the roll is wound as illustrated in Figure 1, it is inserted in a zinc can 18 as shown in Figure 2 and tab 16 is spot-welded to the can wall by a weld 19. A disc 20 of insulating material which is not attacked by alkalies is placed in the bottom of the can to prevent contact between the rod 10 and the bottom of the can.

The electrolyte is prepared by dissolving from 200 to 400 grams of C. P. potassium hydroxide (containing 13 to 14% water) in 100 milliliters of water, 300 grams of potassium hydroxide being the preferred quantity for normal commercial use. This produces solutions containing between 43 and 30% water and 57 and 70% KOH, approximately, or preferably 35% water and 65% KOH approximately. It is necessary to heat the water to about 120° C. to dissolve all the hydroxide.

The cell assembly which has been produced in the manner above described is heated to about 100° C. and immersed at this temperature in the hot liquid electrolyte and a partial vacuum (such as a reduction in pressure to 5 cm. of mercury) is preferably applied to improve the impregnation of the space between the electrodes and the absorption of the electrolyte into the regenerated sheet cellulose spacers.

Some of the regenerated cellulose is attacked by the strong alkali but the attack is insufficient to injure the spacer or reduce its effectiveness in the cell assembly. The spacer absorbs a large quantity of the electrolyte and in so doing swells to fill the available space between the electrodes provided by the corrugation of the zinc electrode. The filled cells are then removed from the electrolyte bath and allowed to cool. The electrolyte crystallizes when the cells have cooled to about 80° C. and at room temperature the electrolyte is a hard solid 24 in which the assembly is imbedded, the melting point usually being above 60° C.

The can 18 has a slightly enlarged portion at its open end providing a shoulder 21. A disc 22 of stiff insulating material such as Bakelite, dielectine, or other sufficiently rigid material is covered on one side and around its edges with a sheet 23 of rubber. Neoprene or similar rubbery material which is resistant to the alkaline electrolyte and this assembly is pressed onto the top of the can 18, so as to rest against shoulder 21 after which the rim of the can is spun over the edge of the assembly to secure it in place and seal the cell. The disc 22 has a relatively large central aperture and rubber sheet 23 has a small hole punched therein. When the cell is assembled, steel rod 10 projects through these apertures and the yielding nature of rubber sheet 23 permits release of any gas generated within the cell through its central hole, thus providing an automatic gas valve. Due to this construction, however, the rubber prevents entrance of carbon dioxide or moisture into the cell from the atmosphere. Instead of discs 22 and 23 the can 18 may be sealed in some cases by pouring a layer of Gilsonite pitch into the top of the can.

Figure 2a shows a preferred form of cell construction and shows the cells embodied in a battery. In this construction containers 80 of the individual cells are molded tubes of rubber hydrochloride or Pliofilm closed at one end. The roll of electrodes and spacers prepared as shown in Figure 1 is first dried at 100° C. and then impregnated with the electrolyte at 110° C., a vacuum being applied for about 2 minutes to facilitate impregnation and removal of gases. The electrolyte is then allowed to cool and the roll removed while the electrolyte is still fluid, the excess is wiped off and the roll inserted in Pliofilm container 80. Zinc tab 16 is made longer in this case so as to extend out of the container. Before contact with the electrolyte rod 10 and tab 16 are coated on their projecting parts with an alkali resistant protective film of resin such as urea-formaldehyde resin or Koroseal to prevent corrosion of these parts. After the impregnated roll has been inserted in container 80 a disc 81 of rubber hydrochloride is placed over the exposed end and a layer 82 of hard inert petroleum wax such as Superlawax having a melting point of about 170° F. or Gilsonite pitch is poured on top to seal the top end of the container. The wax adheres strongly to the Pliofilm walls effectively sealing the container. When cool the cell may be quickly dipped in molten Superlawax to form a thin wax coating over the entire cell.

Any number of such cells may be connected in series by removing the protective film from portions of the terminals and soldering the zinc tab 16 of one cell to the center steel rod 10 of the next cell, and so forth. A simple battery of desired voltage can be made by placing the required number of cells, all connected in series, side by side, in an open-topped cardboard or sheet metal box or tray 84 and pouring a layer 83 of wax over them to cover them and leave only the end terminals exposed.

Figure 3 shows a modified electrode assembly wherein a plain strip of zinc foil 30 is used and is spaced from coated steel electrode 11 by nylon cloth layers 31 placed against the zinc electrode and regenerated sheet cellulose layers 32 in contact with the coated steel electrode. In this case spacing of the threads in the cloth provides the necessary free space into which the regenerated cellulose sheet may expand as it swells when it absorbs electrolyte. Other cloth layers, such as glass cloth and other materials resistant to the electrolyte, may, in some cases, be substituted for the nylon.

Figures 4 to 7 show the construction and assembly of disc type cells embodying features of the invention. One such cell, as shown in Figures 4 and 5, is made up of a zinc disc 40, a steel disc 41 having a coating 42 of cupric oxide composition prepared and applied as previously described, on one face thereof, two glycerine-free regenerated sheet cellulose discs 43 impregnated with the alkaline electrolyte of the previously described composition, and a sealing ring 44. Ring 44 may be made of an impervious sheet material such as Pliofilm or other sealing material not readily attacked by the electrolyte.

The cell may be made by first cementing the Pliofilm washer 44 to the copper oxide compound surface of the steel disc, then soaking the regenerated cellulose discs in a solution of 290 grams KOH and 100 milliliters of water at 100° C. for 5 minutes, removing and rolling off the excess electrolyte with a rubber roller, placing two such discs 43 in the central recess formed by washer 44, then applying a ring 45 of vinyl chloride cement to the zinc disc and pressing it on top of the pre-assembly with the vinyl chloride cement against the Pliofilm. The assembly is then put in a press which is kept at 60° C. until the cement has dried and bonded the assembly together to form a completed cell 50.

Several of such cells may be stacked together as shown in Figure 6 to form a battery of higher voltage. A rubber band 60 is sufficient to hold them together. Terminals such as metal discs 61 having wires 62 soldered to them may be placed at the ends of the stack.

Another type of multi-cell battery can be made as shown in Figure 7 by placing a stack of cells 50 in a cardboard tube 70, providing pressed metal terminal bosses 72 in cardboard end discs 71, filling any free space in the tube with wax 73 and turning in the ends of the tube to maintain contact pressure between the parts.

The peculiar applicability of the solid crystalline potassium hydroxide electrolyte for dry primary cells, especially as compared with other crystalline alkaline electrolytes, will be evident from the following: In measurements made on cells of the structure shown in Fig. 1 with an electrode area of 8 sq. in. and under a meter load of 300 ohms, the voltages obtained with different electrolytes at 20° C. were as follows:

With 200 gm. KOH and 100 ml. water E=1.0 volt
With 360 gm. KOH and 100 ml. water E=.98 volt
With 200 gm. NaOH and 100 ml. water E=.05 volt
With 360 gm. NaOH and 100 ml. water E=less than .01 volt When a load is applied the voltage of the NaOH cells drops to practically zero.

I have found that the specific resistivity at 20° C. of the KOH electrolyte is also considerably lower than the NaOH at 20° C. as is indicated from the following: The resistivity measured in a cell was—

With 200 gms. KOH per 100 ml. of water=32 ohms per cm.$^3$
With 360 gms. KOH per 100 ml. of water=400 ohms per cm.$^3$
With 200 gms. NaOH per 100 ml. of water=421 ohms per cm.$^3$
With 360 gms. NaOH per 100 ml. of water= $3.03 \times 10^8$ ohms per cm.$^3$ In the lowest range, the resistivity of the KOH should exceed 25 ohms per cm.$^3$ at 20° C.

Crystalline lithium hydroxide electrolytes have a still higher resistance. The specific resistance values will vary to some degree with the rate of cooling. The above values were obtained under conditions similar to those encountered in the cells. The resistance values given are those of the crystallized electrolytes outside of the cell and without the addition of other materials.

It is noteworthy that there is almost no difference in resistivity between liquid electrolytes of the prior art having NaOH and KOH respectively as the active ingredients. A 25% solution of either NaOH or KOH has a resistivity in the order of 4 ohms per cm.$^3$ Concentrations of potassium hydroxide above 175 grams C. P. KOH per 100 ml. of water will solidify when cooled to room temperature. These might in some cases be used but to obtain the optimum of shelf life it is essential that the melting point of the crystalline electrolyte exceed the maximum ambient temperature that the cell is expected to encounter. For non-tropical use this should exceed 25° C., but should preferably be higher, and for tropical use it should be much higher, for example above 55° C.

The most practical range of concentrations for the crystalline electrolyte is formed as described above by using between 200 and 400 gms. C. P. potassium hydroxide, yielding compositions containing between 57 and 70% KOH. For normal commercial use 300 grams is preferably used, giving a 65% composition. For tropical use 360 grams may be used, yielding a 68% composition.

Due to the close spacing of the electrodes and the short electrolytic current path of large area thus provided, this cell has a comparatively low internal resistance at ordinary temperatures and good current capacity. The cell has an open circuit voltage of about 1 volt. Two such cells connected in series and having an electrolyte containing 290 grams of potassium hydroxide to 100 milliliters of water, and having a zinc electrode of 8 square inches in area, will deliver 0.1 ampere for at least 5 hours before the combined voltage drops to 0.9 volt on closed circuit.

The addition of a small amount of sulfur, such as 5% or less, or sulfur compound (for example, ammonium polysulfide) to the hydroxide prior to the addition of water so as to form an alkali metal sulfide component in the electrolyte increases the open circuit voltage to 1.2 volts in the case of potassium hydroxide. The shelf life at elevated temperatures, however, is not so long. The addition, in small amounts, of other sulfur group elements, such as selenium, has a similar effect. The internal resistance of the cell may be reduced and the voltage output may also be raised by using a composite spacer comprising pure porous cotton paper, such as "Dexter B" in combination with the regenerated cellulose sheet. Alternate layers may be used. A similar result may be accomplished by the addition of 5% to 20% bentonite to the electrolyte.

While cupric oxide is the preferred depolarizer for highest current capacity, other depolarizers may in some cases be substituted, such as the sulfides of copper, lead sulfide or oxide and the like. Cadmium can be used in place of zinc for the other electrode although it produces a cell of lower voltage and therefore is not so desirable.

Sodium and lithium hydroxides have some limited utility for crystalline electrolytes either singly or in mixtures with potassium hydroxide. Sodium hydroxide solutions containing above 120 grams of C. P. sodium hydroxide (having around 13% water) to 100 ml. of water will solidify when cooled. Compositions having 150 grams produce excessive shelf attack on the electrodes and on the cellulose spacer. This can be reduced by using an alkali resistant zinc alloy or composition.

While specific embodiments of the invention have been described it is intended to cover the invention broadly within the extent and scope of the appended claims.

What is claimed is:

1. The method of making a unitary spacer electrolyte member for dry primary cells which comprises heating a concentrated alkali metal hydroxide electrolyte containing water of hydration and which is normally solid at 25° C. to a temperature at which said electrolyte is fluid and immersing and holding regenerated sheet cellulose therein until said sheet becomes impregnated with said electrolyte.

2. The method of making a dry cell which comprises winding two electrodes in enrolled form with a regenerated cellulose sheet spacer member therebetween, at least one of said electrodes being corrugated or otherwise deformed so as to allow said cellulose sheet to expand, immersing said wound structures in a concentrated alkali metal hydroxide electrolyte containing water of hydration and which is normally solid at 25° C. but which has been heated to a temperature at which it has become fluid, and holding said structure in said electrolyte until the cellulose sheet has become adequately impregnated therewith.

3. The method of making an electrode for primary cells which comprises coating a metal foil with a mixture of finely divided cupric oxide and micronized graphite suspended in a liquid organic alkali-resisting binder solution containing a solvent and baking said coated foil at a temperature below the decomposition temperature of said binder until the solvent is driven off and until the coating is bonded to said foil.

4. The method of making a unitary spacer-electrolyte member for dry primary cells which comprises heating a concentrated potassium hydroxide solution which is normally solid at 25° C. to a temperature at which said solution is fluid and immersing and holding regenerated sheet cellulose therein until said sheet becomes impregnated with said solution.

5. The method of making a dry cell which comprises winding an electrode sheet formed of a metal selected from the group consisting of zinc and cadmium and a depolarizer electrode sheet into enrolled form with absorbent sheet spacers therebetween, immersing the wound structure in a concentrated potassium hydroxide solution which is normally solid at 25° C. while said solution is at a temperature at which said solution is fluid, and holding said structure in said solution until it has become impregnated, and then allowing said structure to cool to solidify said solution.

6. The method of making a dry cell which comprises winding an electrode sheet formed of a metal selected from the group consisting of zinc and cadmium and a depolarizer electrode sheet into enrolled form with absorbent sheet spacers therebetween, at least one of said electrodes being corrugated or otherwise deformed so as to allow said spacers to expand, immersing the wound structure in a concentrated potassium hydroxide solution which is normally solid at 25° C. while said solution is at a temperature at which said solution is fluid, and holding said structure in said solution until it has become impregnated and then allowing said structure to cool to solidify said solution.

SAMUEL RUBEN.

REFERENCES CITED

The following references are of record in the file of this patent:

UNITED STATES PATENTS

| Number | Name | Date |
| --- | --- | --- |
| 405,196 | Barrett | June 11, 1889 |
| 555,304 | Crowdus | Feb. 25, 1896 |
| 856,162 | Kitsee | June 4, 1907 |
| 1,045,822 | Dodge | Dec. 3, 1912 |
| 1,162,449 | Burgess | Nov. 30, 1915 |
| 1,259,485 | Byrne | Mar. 19, 1918 |
| 1,282,057 | Erwin | Oct. 22, 1918 |
| 1,510,617 | Vare | Oct. 7, 1924 |
| 1,744,302 | Engle et al. | Jan. 21, 1930 |
| 1,835,867 | Heise | Dec. 8, 1931 |
| 1,863,791 | Heise | June 21, 1932 |
| 1,891,206 | Ruben | Dec. 13, 1932 |
| 1,920,151 | Ruben | July 25, 1933 |
| 2,062,543 | Waterman | Dec. 1, 1936 |
| 2,078,772 | Pitt | Apr. 27, 1937 |
| 2,231,320 | Burgess | Feb. 11, 1941 |
| 2,275,281 | Berl | Mar. 3, 1942 |

FOREIGN PATENTS

| Number | Country | Date |
| --- | --- | --- |
| 6,664 | Great Britain | 1911 |
| 399,561 | Great Britain | Oct. 9, 1933 |